United States Patent
Fifer et al.

(10) Patent No.: US 7,137,033 B2
(45) Date of Patent: Nov. 14, 2006

(54) METHOD, SYSTEM, AND PROGRAM FOR SYNCHRONIZING SUBTASKS USING SEQUENCE NUMBERS

(75) Inventors: Nicholas D. Fifer, Tucson, AZ (US); Frederick James Carberry, II, Tucson, AZ (US); William Henry Travis, Tucson, AZ (US); Alex Chen, Tucson, AZ (US); Theodore Timothy Harris, Jr., Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 508 days.

(21) Appl. No.: 10/721,018

(22) Filed: Nov. 20, 2003

(65) Prior Publication Data

US 2005/0132252 A1 Jun. 16, 2005

(51) Int. Cl.
*G06F 11/00* (2006.01)
(52) U.S. Cl. ............................................. 714/20; 714/6
(58) Field of Classification Search .................... 714/6, 714/20
See application file for complete search history.

(56) References Cited

U.S. PATENT DOCUMENTS

| | | | | |
|---|---|---|---|---|
| 4,425,615 A | * | 1/1984 | Swenson et al. | 711/114 |
| 5,224,215 A | * | 6/1993 | Disbrow | 709/234 |
| 5,546,536 A | * | 8/1996 | Davis et al. | 714/20 |
| 5,590,298 A | * | 12/1996 | Kawamoto | 711/3 |
| 5,657,440 A | * | 8/1997 | Micka et al. | 714/16 |
| 5,734,818 A | * | 3/1998 | Kern et al. | 714/20 |
| 5,734,895 A | * | 3/1998 | Matsuo | 707/202 |
| 5,835,915 A | * | 11/1998 | Carr et al. | 707/202 |
| 6,189,079 B1 | * | 2/2001 | Micka et al. | 711/162 |
| 6,237,079 B1 | * | 5/2001 | Stoney | 712/34 |
| 6,553,511 B1 | * | 4/2003 | DeKoning et al. | 714/6 |
| 6,671,777 B1 | * | 12/2003 | Krehbiel et al. | 711/114 |
| 6,732,125 B1 | * | 5/2004 | Autrey et al. | 707/204 |
| 6,745,303 B1 | * | 6/2004 | Watanabe | 711/161 |
| 6,751,750 B1 | * | 6/2004 | Humlicek | 714/20 |
| 6,823,336 B1 | * | 11/2004 | Srinivasan et al. | 707/8 |
| 6,874,104 B1 | * | 3/2005 | Josten et al. | 714/15 |
| 6,996,691 B1 | * | 2/2006 | Sicola et al. | 711/162 |
| 2002/0078315 A1 | * | 6/2002 | Howard et al. | 711/162 |
| 2003/0028580 A1 | * | 2/2003 | Kucherawy | 709/101 |
| 2005/0172166 A1 | * | 8/2005 | Eguchi et al. | 714/20 |

\* cited by examiner

*Primary Examiner*—Bryce P. Bonzo
(74) *Attorney, Agent, or Firm*—William K. Konrad; Konrad Raynes & Victor LLP

(57) ABSTRACT

Provided is a method, system and program for synchronizing sequential subtasks of a task, so that the subtasks can be dispatched to generate operations in a particular sequence. In one embodiment, a subtask which has been prepared for dispatching is queued in a queue until the queued subtask is the next subtask in sequence for dispatching. In one embodiment, the subtasks may be sorted in the queue by task and by subtask sequence.

24 Claims, 9 Drawing Sheets

METHOD, SYSTEM, AND PROGRAM FOR SYNCHRONIZING SUBTASKS USING SEQUENCE NUMBERS

BACKGROUND OF THE INVENTION

1. Field of the Invention

The present invention relates to a method, system, and program for transmitting tasks from one processor to another.

2. Description of the Related Art

Disaster recovery systems can address a sudden catastrophic failure in which data is lost at a location. To assist in recovery of data updates, a copy of data may be provided at a remote location. Such dual or shadow copies are typically made as the application system is writing new data to a primary storage device.

International Business Machines Corporation (IBM), the assignee of the subject patent application, provides several remote mirroring systems, including, for example: a synchronous Peer-to-Peer Remote Copy (PPRC®) service and a PPRC® Extended Distance service in an Enterprise Storage Server (ESS) system. Some IBM mirroring systems are described in IBM publication "Remote Copy: Administrator's Guide and Reference," IBM document no. SC35-0169-02 (IBM Copyright 1994, 1996). The synchronous PPRC ® service provides a technique for recovering data updates that occur between a last, safe backup and a system failure. Such data shadowing systems can also provide an additional remote copy for non-recovery purposes, such as local access at a remote site. With the synchronous PPRC® service, a primary storage subsystem maintains a copy of predefined datasets on a secondary storage subsystem. The copy may be used for disaster recovery. Changes to data are copied to the secondary storage subsystem as an application updates the data. The copy is maintained by intercepting write instructions to the synchronous PPRC® dataset and generating appropriate write instructions from the primary storage system to the secondary storage system. The write instructions may update data, write new data, or write the same data again. The synchronous PPRC® service copies data to the secondary storage subsystem to keep the data synchronous with a primary storage subsystem. That is, an application system writes data to a volume and then transfers the updated data over, for example, Enterprise System Connection (ESCON®) fiber channels to the secondary storage subsystem. The secondary storage subsystem writes the data to a corresponding volume.

With synchronous PPRC®, the copy at the secondary storage subsystem is maintained by intercepting write instructions to the dataset at the primary storage subsystem and generating appropriate write instructions from the primary storage system to the secondary storage system. PPRC® Extended Distance service does not write to secondary storage subsystem before acknowledging to the host the write to the primary. Instead, for the PPRC® Extended Distance service, when a track is written, information is stored that indicates that the track is to be transferred to the secondary storage subsystem at a later time. An asynchronous process collects updates at the primary storage subsystem and sends the updates to the secondary storage subsystem.

Computing systems often include one or more host computers ("hosts") for processing data and running application programs, direct access storage devices (DASDs) for storing data, and a storage controller for controlling the transfer of data between the hosts and the DASD. Storage controllers, also referred to as control units or storage directors, manage access to a storage space often comprised of numerous hard disk drives connected in a loop architecture, otherwise referred to as a Direct Access Storage Device (DASD). Hosts may communicate Input/Output (I/O) requests to the storage space through the storage controller. To maintain availability in the event of a failure, many storage controllers known in the prior art provide redundant hardware clusters.

Each hardware cluster comprises a processor complex, cache, non-volatile storage (NVS), such as a battery backed-up Random Access Memory (RAM), and separate power supply to provide connection paths to the attached storage. The NVS in one cluster backs up write data from the cache in the other cluster so that if one cluster fails, the write data in the cache of the failed cluster is stored in the NVS of the surviving cluster. After one cluster fails, all Input/Output (I/O) requests would be directed toward the surviving cluster. When both clusters are available, each cluster may be assigned to handle I/O requests for specific logical storage devices configured within the physical storage devices.

Each storage controller may have an adapter to communicate over a network with a host computer or another storage controller. For example, the write instructions from the primary storage controller to the secondary storage controller may be generated by a processor of the adapter of the primary storage controller and issued over the network to the secondary storage controller. The network may comprise a Storage Area Network (SAN), Local Area Network (LAN), Intranet, the Internet, Wide Area Network (WAN), etc.

The adapter as well as the clusters of the storage controller may each have a mail manager process to communicate with each other. For example, as shown in FIG. 1, an application program 18 operating under an operating system 20 of one cluster 21 can instruct its mail manager process 22 to send a task, subtask or other remote operation request to a network adapter 23. The mail manager process 22 of the cluster folds the remote operation requests into mail messages which are placed in an outgoing mail queue 28. The mail manager process 22 pulls the mail messages from the outgoing mail queue 28 and stores the mail messages containing the remote operation requests in a memory area of the adapter referred to as an incoming mail queue 30. Conversely, an application program 38 operating under an operating system 40 of the adapter 23 can instruct its mail manager process 42 to send a task, subtask or other remote operation request to the cluster 21. The mail manager process 42 of the adapter 23 pulls the mail messages from the outgoing mail queue 48 and stores the mail messages containing the remote operation requests in a memory area in an incoming mail queue 50 of the cluster 21.

SUMMARY OF ILLUSTRATED EMBODIMENTS

Provided is a method, system and program for synchronizing subtasks using sequence numbers. In one embodiment, an index is maintained in a data structure in a processor of a storage controller. The index is associated with a write data task for writing data to a storage device coupled to the storage controller and for writing data to a another storage device coupled to another storage controller. In one embodiment, the write data task comprises a sequence of data writing subtasks in which each subtask has a sequence number identifying the position of the subtask in the sequence of subtasks of the write data task. In addition, the first index identifies the sequence number of the next subtask in sequence to be sent to another processor of the first storage controller.

In one embodiment, a subtask of the sequence of data writing subtasks is added to a queue. In one embodiment, the task may be queued in order in by task and by sequence number. In addition, the sequence number of the subtask in the queue is compared to the index of the data structure. If the subtask in the queue has the sequence number identified by the index, the subtask is dispatched by one of the processors of the first storage controller to another processor of the first storage controller to generate a write command to the second storage controller.

There are additional aspects to the present inventions. It should therefore be understood that the preceding is merely a brief summary of some embodiments and aspects of the present inventions. Additional embodiments and aspects of the present inventions are referenced below. It should further be understood that numerous changes to the disclosed embodiments can be made without departing from the spirit or scope of the inventions. The preceding summary therefore is not meant to limit the scope of the inventions. Rather, the scope of the inventions is to be determined by appended claims and their equivalents.

BRIEF DESCRIPTION OF THE DRAWINGS

Referring now to the drawings in which like reference numbers represent corresponding parts throughout.

DETAILED DESCRIPTION OF ILLUSTRATED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 2:
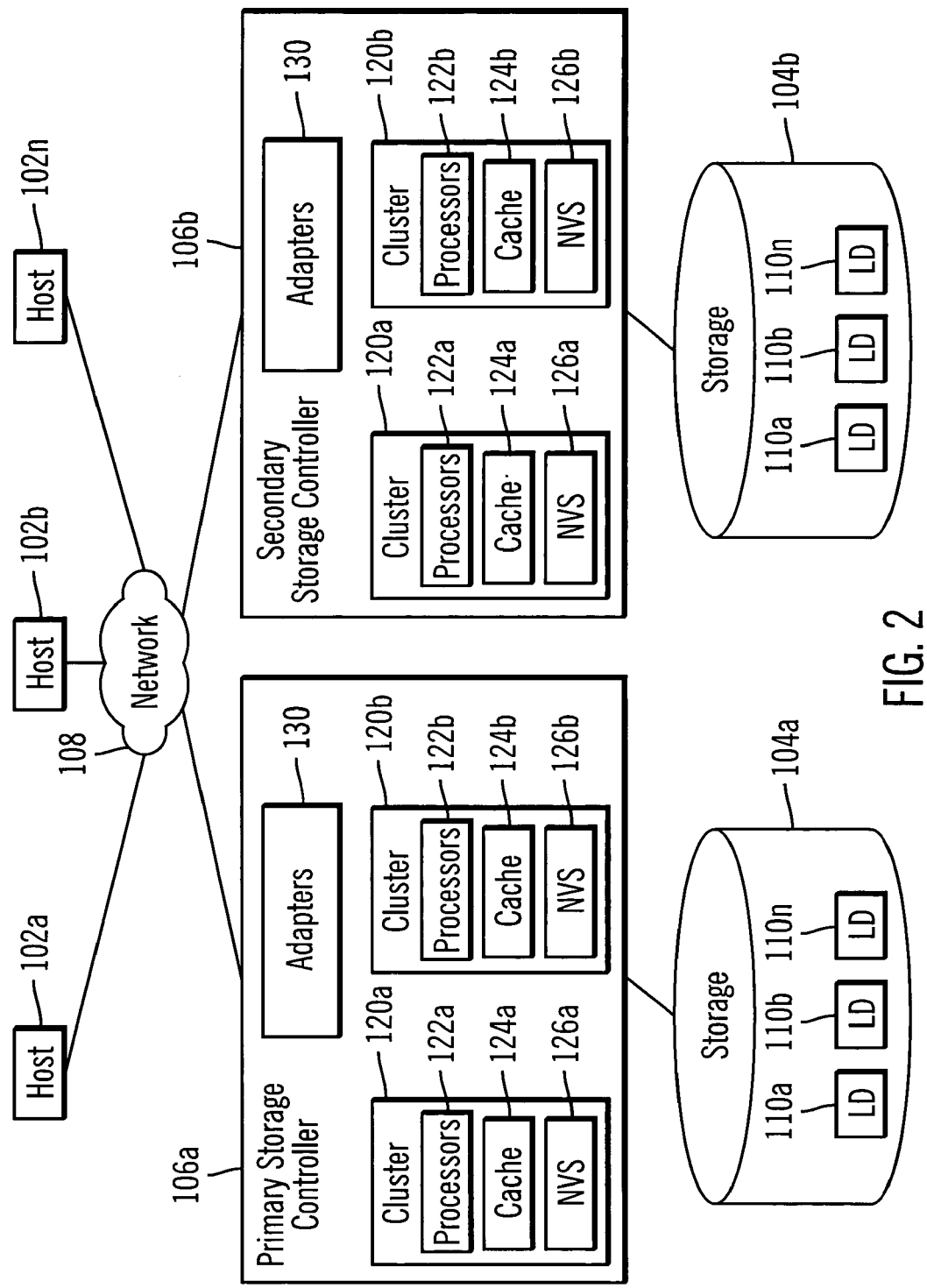
FIG. 2 illustrates an example of a computing environment in which aspects of the invention are implemented.

FIG. 2 illustrates a computing architecture in which aspects of the invention are implemented. One or more hosts 102a, 102b . . . 102n are in data communication with a primary storage system 104a, such as a DASD or any other storage system known in the art, via a primary storage controller 106a. In a similar manner, the hosts 102a, 102b . . . 102n are in data communication with a secondary storage system 104b, such as a DASD or any other storage system known in the art, via a secondary storage controller 106b which may be a remote storage controller, for example. The host 102 may be any computing device known in the art, such as a server, mainframe, workstation, personal computer, hand held computer, laptop, telephony device, network appliance, etc. The storage controllers 106a, 106b and host system(s) 102 communicate via a network 108, which may comprise a Storage Area Network (SAN), Local Area Network (LAN), Intranet, the Internet, Wide Area Network (WAN), etc. The primary and secondary storage systems 104a, 104b may each be comprised of hard disk drives, tape cartridge libraries, optical disks, or any suitable non-volatile storage medium known in the art.

The primary and secondary storage systems 104a, 104b may each be arranged as an array of storage devices, such as a Just a Bunch of Disks (JBOD), DASD, Redundant Array of Independent Disks (RAID) array, virtualization device, etc. The primary and secondary storage controllers 106a, 106b may comprise any storage controller or server known in the art, such as the IBM Enterprise Storage Server (ESS) or any other storage controller known in the art. In certain implementations, the storage space in each of the storage systems 104a, 104b may be configured as a plurality of logical devices (LD) 110a, 110b, . . . 110n.

The primary storage 104a or the logical devices 110a, 110b . . . 110n may each be divided into blocks of storage containing blocks of data, and the blocks of storage can be further divided into sub-blocks of storage that contain sub-blocks of data. In certain implementations, the blocks of data are contents of tracks, while the sub-blocks of data are contents of sectors of tracks. For ease of reference, the terms tracks and sectors will be used herein as examples of blocks of data and sub-blocks of data, but use of these terms is not meant to limit the technique of the invention to tracks and sectors. The techniques of the invention are applicable to any type of storage, block of storage or block of data divided in any manner.

The storage controllers 106a, 106b each include two separate clusters 120a, 120b of hardware components to provide redundancy for improved availability. Although the illustrated embodiment is described in connection with a storage controller having clusters, it is appreciated that the invention may be applicable to a variety of systems utilizing a single processor or multiple processors in which one processor can direct operations to be executed by another processor.

Each cluster 120a, 120b of the illustrated embodiment may be maintained on a separate power boundary, and includes a processor complex 122a, 122b, a cache 124a, 124b, and a non-volatile storage unit (NVS) 126a, 126b. The NVS 126a, 126b may comprise a battery backed-up RAM or any other type of non-volatile or volatile backup cache used to backup data in cache. The hosts 102a, 102b . . . 102n would submit application I/O requests directed to a target logical device (LD) 110a, 110b . . . 110n, including write data, to the cluster 120a, 120b to which the target logical device (LD) 110a, 110b . . . 110n is assigned. The NVS 126a, 126b in one cluster 120a, 120b is used to backup write data in the cache 124b, 124a in the other cluster 120b, 120a, e.g., NVS 126a backs up write data in cache 124b.

The primary storage controller 106a includes a read process for reading data, and a write process for writing data. The primary storage controller 106a also includes a sync process for transferring data from the primary storage controller 106a to remote storage, such as storage at the secondary storage controller 106b. In certain implementations, the sync process may perform synchronization of data for the synchronous PPRC® and for PPRC® Extended Distance. In such cases, the sync process runs continuously for PPRC® Extended Distance, and starts up and completes for host writes for the synchronous PPRC®. In certain implementations, there may be multiple sync processes (e.g., different sync processes for synchronous PPRC® and for PPRC® Extended Distance or one sync process for each volume on primary storage 112 for PPRC® Extended Distance).

In certain implementations, the read process, write process, and sync process are implemented as firmware. In certain implementations, the read process, write process and sync process are implemented as separate software programs for each process. In certain implementations, the read process, write process and sync process 106 may be combined with each other or other software programs.

Secondary storage controller 106b provides one or more recovery systems access to disk storage, such as secondary storage 104b, which maintains back-up copies of all or a subset of the volumes of the primary storage 104a. Secondary storage may be a Direct Access Storage Device (DASD). Secondary storage 104b is also divided into blocks of storage containing blocks of data, and the blocks of storage are further divided into sub-blocks of storage that contain sub-blocks of data. In certain implementations, the blocks of data are tracks, while the sub-blocks of data are sectors of tracks. For ease of reference, the terms tracks and sectors will be used herein as examples of blocks of data and sub-blocks of data, but use of these terms is not meant to limit the technique of the invention to tracks and sectors. The techniques of the invention are applicable to any type of storage, block of storage or block of data divided in any manner.

In certain implementations, removable storage (instead of or in addition to remote storage), such as secondary storage 104b may be used to maintain back-up copies of all or a subset of the primary storage 104a, and the techniques of the invention transfer data to the removable storage rather than to the remote storage. The removable storage may reside at the primary storage controller 106a.

In certain implementations, the primary storage controller 106a and secondary storage controller 106b may be comprised of the IBM 3990, Model 6 Storage Controller, Enterprise Storage Server, or any other control unit known in the art.

In certain implementations, the primary storage controller 106a and/or secondary storage controller 106b may comprise any computing device known in the art, such as a mainframe, server, personal computer, workstation, laptop, handheld computer, telephony device, network appliance, virtualization device, storage controller, etc.

A primary site may include multiple primary storage controllers, primary storage, and host computers. A secondary site may include multiple secondary storage controllers, recovery systems, and secondary storage.

In certain implementations of the invention, data is maintained in volume pairs. A volume pair is comprised of a volume in a primary storage device (e.g., primary storage 104a) and a corresponding volume in a secondary storage device (e.g., secondary storage 104b) that includes a consistent copy of the data maintained in the primary volume. For example, primary storage 104a may include Volume1 and Volume2, and secondary storage 104b may contain corresponding Volume1 and Volume2. A primary storage controller may be provided to control access to the primary storage and a secondary storage controller may be provided to control access to the secondary storage.

In certain implementations, the primary storage controller 106a and secondary storage controller 106b communicate via communication paths, such as direct high speed transmission lines (e.g., an Enterprise System Connection (ESCON®), or Fiber connection (FICON) or Fibre Connection Protocol (FCP) link). However, the communication paths may be comprised of any other communication means known in the art, including network transmission lines, fiber optic cables, etc.

Figure 1:
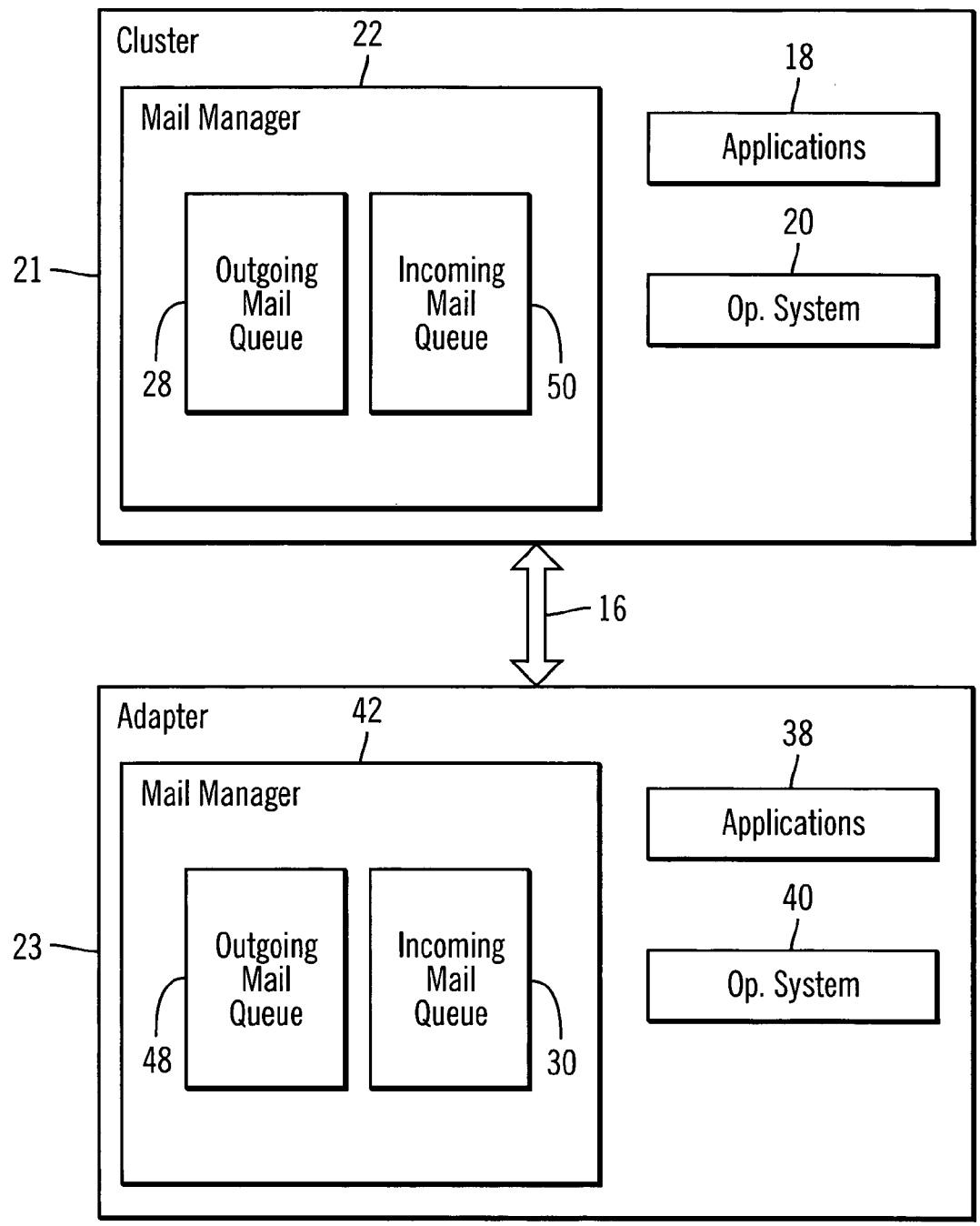
FIG. 1 illustrates a prior art mail manager process between a cluster and an adapter of a storage controller

Each storage controller 106a, 106b of the illustrated embodiment further includes a network adapter 130 which permits each storage controller 106a, 106b to communicate with each of the hosts 102a, 102b . . . 102n as well as the other storage controller. For communication among the clusters and adapter of each storage controller 106a, 106b, each cluster 120a, 120b and adapter 130 has a mail manager similar to the mail manager 22, 26 discussed above in connection with FIG. 1.

To write data to a target logical device 110a, 110b . . . 110n, a host such as host 102a issues a write command such as a SCSI (small computer system interface) command embedded in a suitable network protocol frame as a Fiber Channel Protocol (FCP) frame to the primary storage controller 106a. The network adapter 130 of the primary storage controller 106a receives the write command and sends an appropriate write operation via its mail manager to the mail manager of the one of the clusters 120a, 120b of the primary storage controller 106a.

As previously mentioned, it is often useful for data to be written onto more than one storage device so that if the data is lost on one device, the data may be retrieved from the other device. One technique for achieving this redundant data writing is to pair a logical storage device 110a, 110b . . . 110n of one storage controller 106a with a logical storage device 110a, 110b . . . 110n of another storage controller 106b, for example. Thus, for example, the logical storage device 110a of the storage controller 106a may be paired with the logical storage device 110a of the storage controller 106b. In such an arrangement, the cluster 120a of the storage controller 106a can be programmed to recognize that a write operation to the logical storage device 110a of the storage controller 106a should be repeated on the logical storage device 110a of the storage controller 106b.

For synchronous PPRC®, before a host such as host 102a completes writing a set of tracks to the primary storage controller 106a, all tracks in the set will typically have also been transferred to the secondary storage controller 106b. In certain implementations, this transfer would be accomplished by a synchronization process which will typically have been completed before an acknowledgment of completion of the write process is sent to the host 102a.

For PPRC® Extended Distance, the host 102a will complete writing a track to the primary storage controller 106a without the track having been sent to the secondary storage controller 106b. After the track has been written to the primary storage controller 106b, the sync process will discover that an indicator corresponding to the track is set to indicate that the track is out of sync with a corresponding track at the secondary storage controller 106b and will send the track to the secondary storage controller 106b. That is, the track is sent asynchronously with respect to the track written by the host.

To send a track to the secondary storage controller 106b, the cluster 120a can send a mail message to the network adapter 130 of the primary storage controller 106*a*. In response, the network adapter 130 of the primary storage controller 106*a* can, in a manner similar to that of a host 102*a*, 102*b* . . . 102*n* issue a write command such as a SCSI (small computer system interface) command embedded in a suitable network protocol frame as a Fiber Channel Protocol (FCP) frame to the secondary storage controller 106*b*. The network adapter 130 of the secondary storage controller 106*b* receives the write command and sends an appropriate write operation via its mail manager to the mail manager of the one of the clusters 120*a*, 120*b* of the secondary storage controller 106*b*.

For some operations, it may be useful to perform them in a particular order. For example, write operations to multiple tracks of a storage device can be performed in a sequence, in which one track is written to at a time, and the tracks are written to in a particular order. To facilitate the processing of the operations in a particular sequence, it is often useful to send the operations to the secondary storage controller 106*b* in sequence. In some applications, it may be a requirement that the operations be sent to the secondary storage controller 106*b* in sequence.

Figure 3:
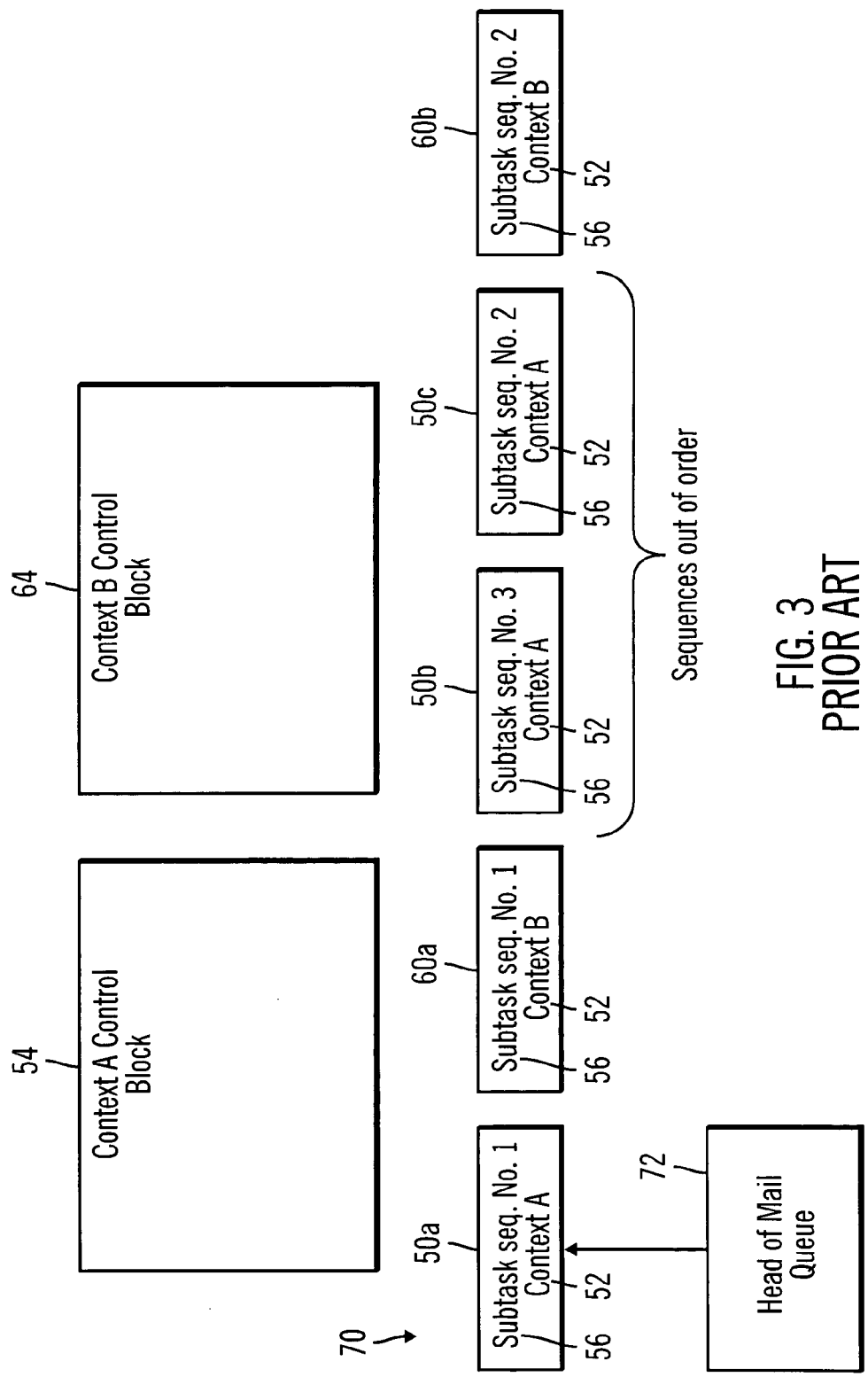
FIG. 3 illustrates a series of subtasks of various tasks or contexts, which can be sent to an adapter to generate write commands for a secondary storage controller.

For example, FIG. 3 shows two series of multitrack operations or tasks, one series identified as Context A and the other as Context B. In this embodiment, use of context provides a manner to tie together a multitrack operation. These two multitrack tasks will be performed by a cluster such as the cluster 120*a* of the primary storage controller to write data in multitrack operations on a logical storage device such as the logical device 110*a* of the primary storage controller 106*a*. In addition, these two multitrack tasks will be forwarded to the secondary storage controller 106*b* so that the same data may be written to the logical storage device 110*a* of the secondary storage controller 106*b*. Hence, the two multitrack tasks, Context A and Context B are shown in FIG. 3 being forwarded to the mail manager of the cluster 120*a* of the primary storage controller 106*a* to be sent as mail to the adapter 130 of the primary storage controller 106*a* so that write commands can be issued to the secondary storage controller 106*b* to store the data on the logical device 110*a* of the secondary storage system 104*b*.

Multitrack task Context A comprises a sequence of subtasks 50*a*, 50*b*, 50*c* . . . in which each subtask has a pointer 52 which points to a control block 54 which controls the multitrack operation Context A. Each subtask 50*a*, 50*b*, 50*c* . . . of the multitrack operation Context A further has a field 56 which identifies the sequence number of that subtask within the multitrack operation Context A. In a similar manner, the multitrack operation Context B comprises a sequence of subtasks 60*a*, 60*b*, . . . in which each subtask has a pointer 52 which points to a control block 64 which controls the multitrack operation Context B. Each subtask 60*a*, 60*b*, . . . of the multitrack operation Context B further has a field 56 which identifies the sequence number of that subtask within the multitrack operation Context B.

The subtasks 50*a*, 50*b* . . . of the Context A are interspersed with the subtasks 60*a*, 60*b* . . . of the Context B and together form a queue 70 of subtasks 50*a*, 50*b* . . . and 60*a*, 60*b* . . . which are being forwarded to the mail manager. In the example of FIG. 3, the subtask 50*a*, assigned sequence number 1 of Context A is at the front or head of the queue 70 as indicated by a pointer 72. Next in line in the queue 70 is the subtask 60*a*, assigned sequence No. 1 of the Context B. It is noted that the next two subtasks in line are subtasks 50*b* and 50*c* of Context A and that subtasks 50*b* and 50*c* are out of sequential order. That is, subtask 50*b* assigned sequence no. 3 of Context A is in front of subtask 50*c* assigned sequence no. 2 of Context A. Subtasks may become out of sequential order by having multiple processors (such as six per cluster, for example) queuing tasks and subtasks in different order. If sent to the adapter out of sequential order, the subtasks of Context A could be sent to the secondary storage controller 106*b* out of sequence.

Figure 4:
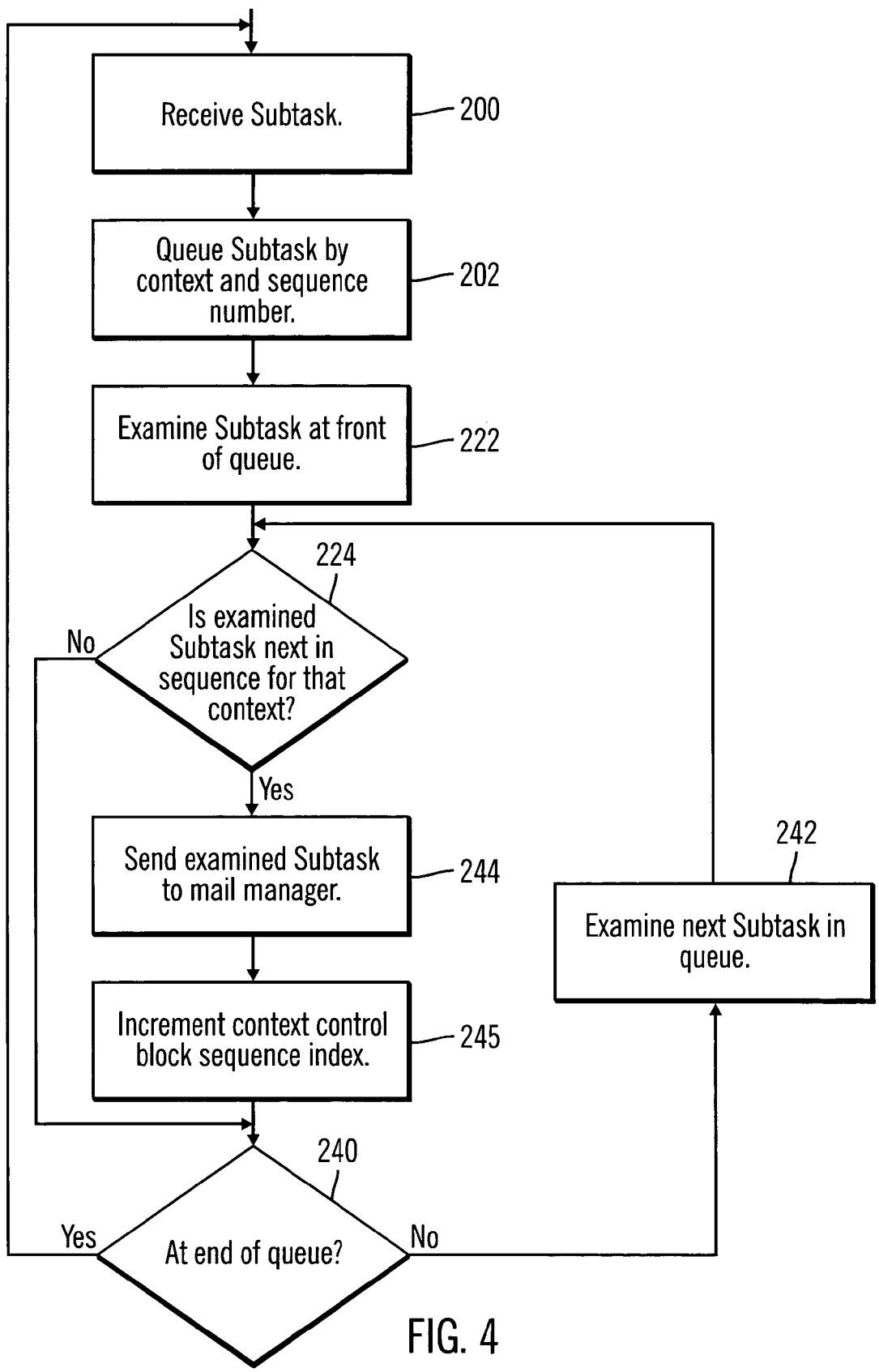
FIG. 4 illustrates logic to manage sending of subtasks of various contexts to generate write commands for a secondary storage controller in accordance with implementations of the invention.

FIG. 4 shows operations of a cluster 120*a* which can facilitate sending subtasks to a secondary storage controller such as controller 106*b* in a particular sequence. In this example, several contexts, Context A, Context B . . . Context N, each comprising a sequence of subtasks are being prepared by the cluster 120*a* in response to one or more write operations originated by a host such as the host 102*a*. Each Context A, Context B . . . Context N is a multitrack operation in which data will be written onto multiple tracks of a logical storage device such as device 110*a* of the storage system 104*a*. In this example, these same multitrack write operations are to be performed on another logical storage device such as the device 110*a* of the storage system 104*b* to provide redundant storage of the data.

Figure 5A:
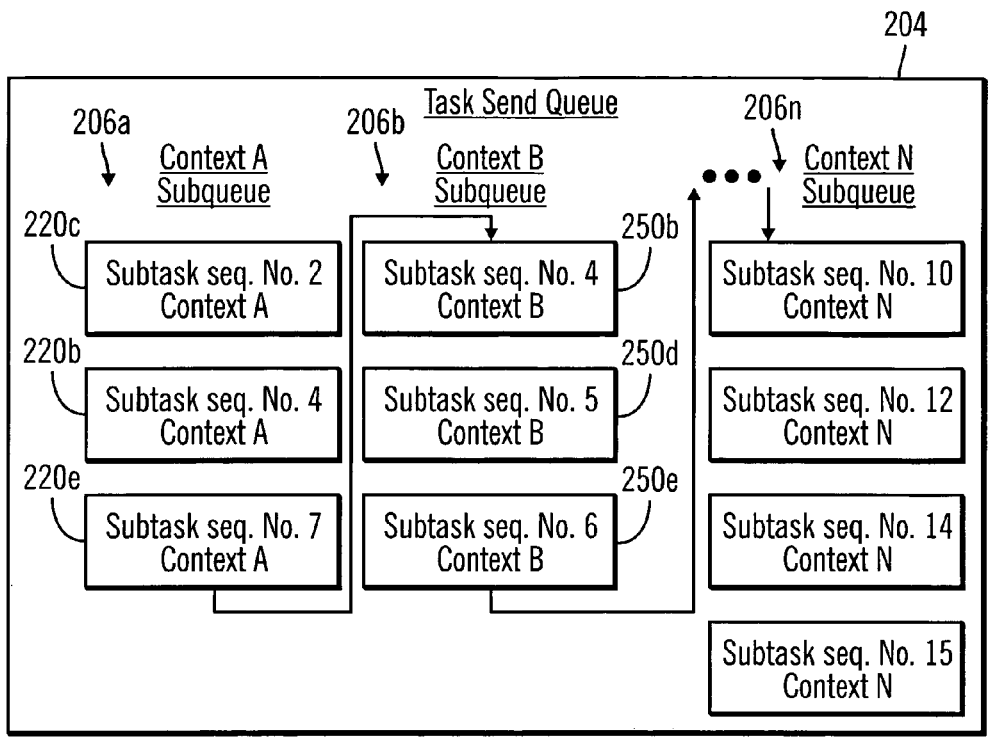
FIGS. 5A–5E each illustrate queuing of subtasks of various contexts in accordance with implementations of the invention.

When a subtask of a context has been prepared and is ready (block 200) for forwarding to the secondary storage controller 106*b*, rather than sending the subtask directly to the mail manager of the cluster 120*a* to forward the subtask as a mail message to the network adapter 130 of the storage controller 106*a*, the subtask is queued (block 202) in a queue such as the queue 204 of FIG. 5A, in which the subtasks are sorted by context and sequence number. Thus, in the example of FIG. 5A, the queue 204 includes a subqueue 206*a*, 206*b* . . . 206*n* for each Context A, Context B . . . Context N, respectively. Thus, the subtasks for Context A are queued in subqueue 206*a* and are sorted in sequential order. Similarly, the subtasks for Context B are queued in subqueue 206*b*, again, in sequential order.

Figure 5B:
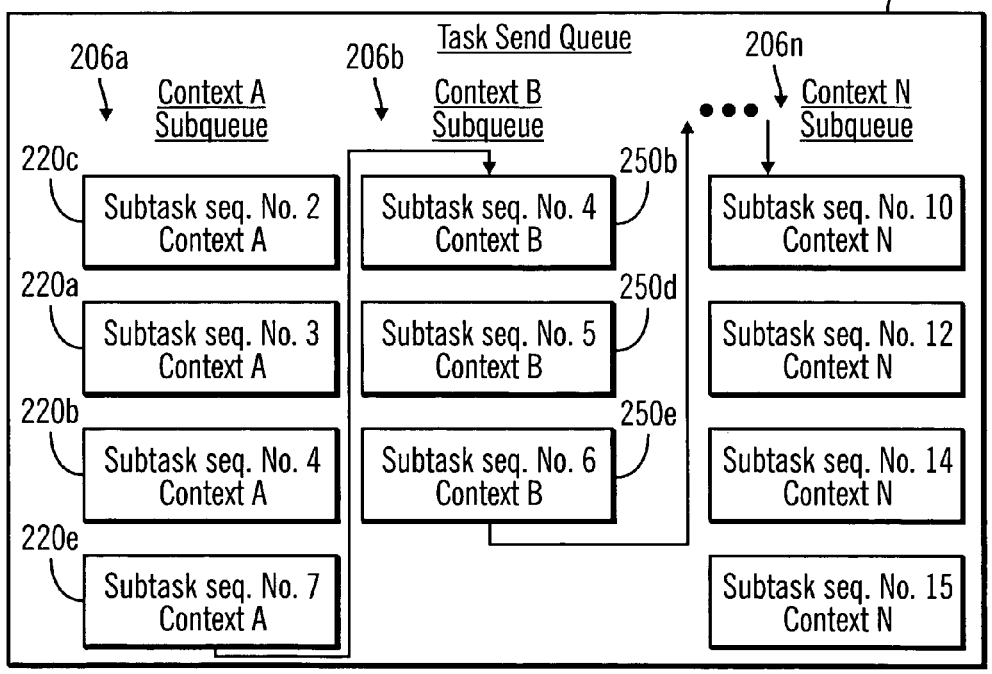
Figure 6:
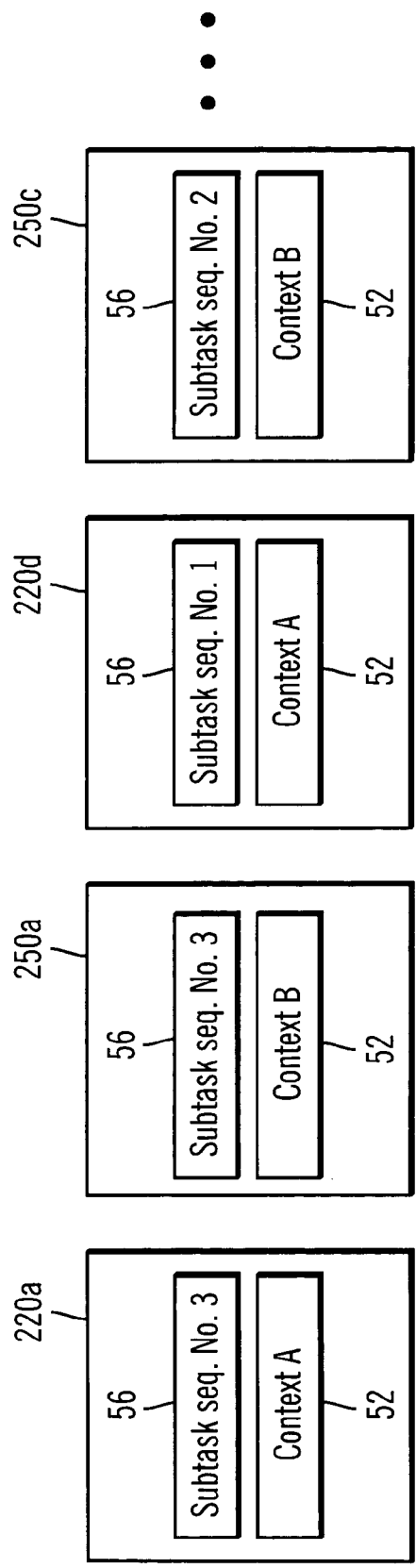
FIG. 6 illustrates another series of subtasks of various contexts, which can be sent to an adapter to generate write commands for a secondary storage controller.

FIG. 6 shows an example of a subtask 220*a* of a Context A which has been prepared (block 200) for forwarding to the secondary storage controller 106*b*. Accordingly, the subtask 220*a* is queued in the queue 204 as shown in FIG. 5B. Because subtask 220*a* is associated with Context A (as indicated by the field 52), the subtask 220*a* is queued in the subqueue 206*a* of the queue 204. In addition, because the subtask 220*a* has sequence number "3" in this example, subtask 220*a* is placed in front of subtask 220*b* having sequence number "4" and after subtask 220*c* having sequence number "2".

Figure 7:
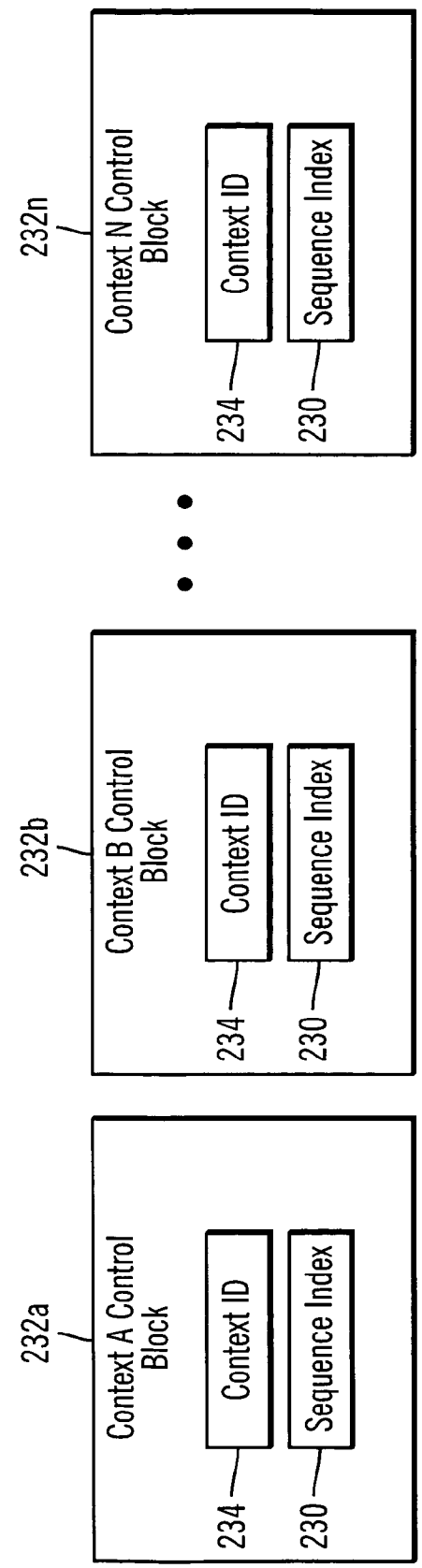
FIG. 7 illustrates information in a context control block data structure in accordance with implementations of the invention.

Once a subtask has been queued (block 202) in the proper subqueue 206*a*, 206*n* . . . 206*n* for the context of the subtask and has been placed within the subqueue in the proper sequential order, the queue 204 of FIG. 5B is "walked" to determine if any of the queued subtasks can be forwarded to the mail manager to generate a write operation for the secondary storage controller 106*b*. Accordingly, the subtask at the front of the queue is examined (block 222). In the example of FIG. 5B, the subtask at the front of the queue is subtask 202*c* of the subqueue 206*a*. A determination is made (block 224) as to whether subtask 220*c* is the next in sequence for the context, here Context A, in this example. This may be accomplished for example, by comparing the sequence number of subtask 220, here sequence no. 2, to an index field 230 (FIG. 7) of a control block 232*a*, 232*b* . . . 232*n* which may be maintained for each context as identified by a field 234. In this example, the index field 230 of the control block 232*a* indicates that the next subtask in sequence for Context A is subtask sequence no. 1. Since subtask 220*c* has sequence no. 2, it is determined (block 224) that the subtask 220*c* is not the next in sequence for Context A.

If the end of the queue 204 has not been reached (block 240), the next subtask of the queue 204 is examined (block 242). This walking of the queue 204 is continued until the end of the queue is reached (block 240). If in walking the queue 204 a subtask is examined (block 242) and is found (block 224) to be the subtask next in sequence for its associated context, that subtask is sent (block 244) to the mail manager of the cluster to be sent as mail to the cluster adapter 130 so that a write operation to the secondary storage controller 106b can be generated.

Figure 5C:
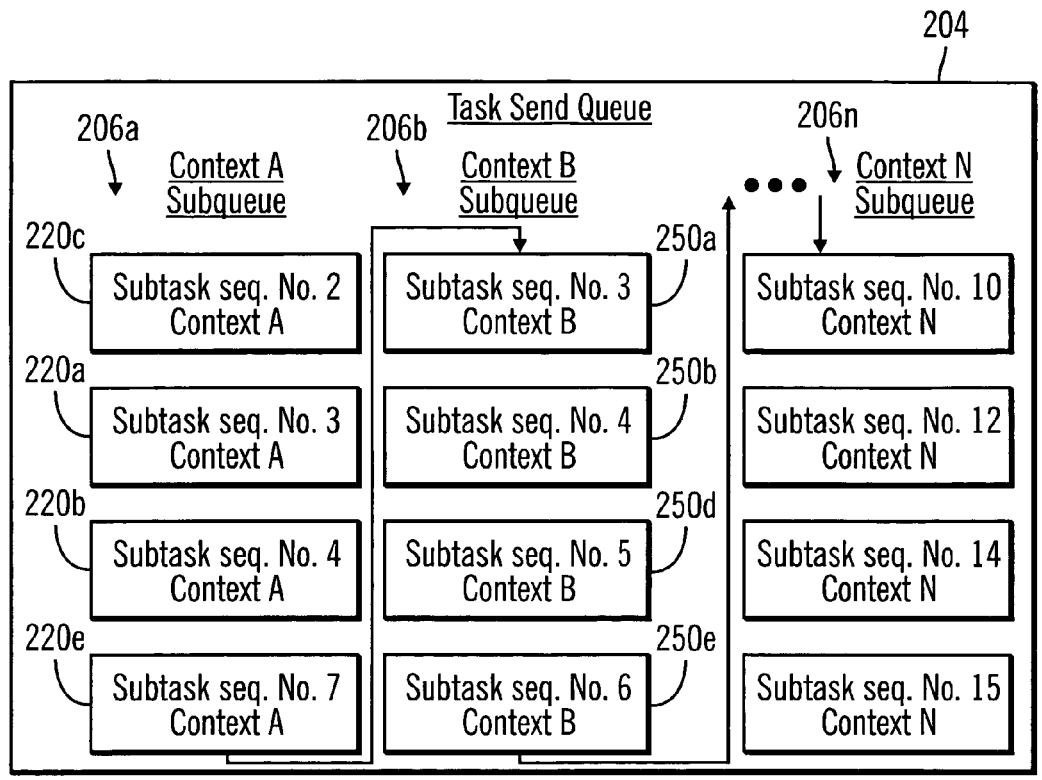

FIG. 6 shows an example of another subtask 250a of a Context B which has been prepared and received (block 200) for forwarding to the secondary storage controller 106b. Accordingly, the subtask 250a is queued in the queue 204 as shown in FIG. 5C. Because subtask 250a is associated with Context B (as indicated by the field 52), the subtask 250a is queued in the subqueue 206b of the queue 204. In addition, because the subtask 250a has sequence number "3" in this example, subtask 250a is placed in front of subtask 250b having sequence number "4".

The queue 204 of FIG. 5C is again "walked" to determine if any of the queued subtasks can be forwarded to the mail manager to generate a write operation for the secondary storage controller 106b. Accordingly, the subtask at the front of the queue is examined (block 222). In the example of FIG. 5C, the subtask at the front of the queue remains subtask 220c of the subqueue 206a. Once the walking of the queue 204 reaches subtask 250a, a determination is made (block 224) as to whether subtask 250a is the next in sequence for the associated context, here Context B, in this example. This may be accomplished for example, by comparing the sequence number of subtask 250a, here sequence no. 3, to an index field 230 of a control block 232b which indicates that the next subtask in sequence for Context B is subtask sequence no. 2. Since subtask 250a has sequence no. 3, it is determined (block 224) that the subtask 250a is not the next in sequence for Context B. This walking of the queue 204 is continued until the end of the queue is reached (block 240).

Figure 5D:
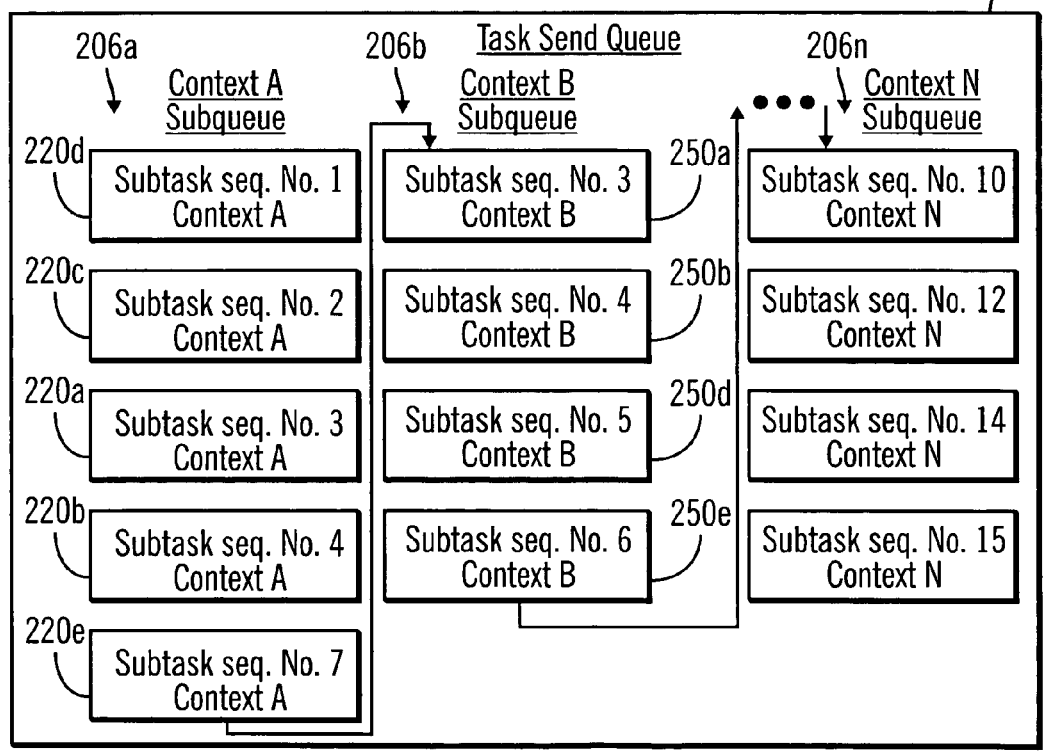

FIG. 6 shows an example of another subtask 220d of the Context A which has been prepared and received (block 200) for forwarding to the secondary storage controller 106b. Accordingly, the subtask 220d is queued in the queue 204 as shown in FIG. 5D. Because subtask 220d is associated with Context A (as indicated by the field 52), the subtask 220d is queued in the subqueue 206a of the of the queue 204. In addition, because the subtask 220d has sequence number "1" in this example, subtask 220d is placed in front of subtask 220c having sequence number "2".

The queue 204 of FIG. 5D is again "walked" to determine if any of the queued subtasks can be forwarded to the mail manager to generate a write operation for the secondary storage controller 106b. Accordingly, the subtask at the front of the queue is examined (block 222). In the example of FIG. 5D, the subtask at the front of the queue is now subtask 220d of the subqueue 206a. A determination is made (block 224) as to whether subtask 220d is the next in sequence for the associated context, here Context A, in this example. Comparing the sequence number of subtask 220d, here sequence no. 1, to the index field 230 of a control block 232a, indicates that the next subtask in sequence for Context A is subtask sequence no. 1. Since subtask 220d has sequence no. 1, subtask 220d is sent (block 244) to the mail manager of the cluster to be sent as mail to the cluster adapter 130 so that a write operation to the secondary storage controller 106b can be generated in accordance with subtask 220d of Context A. In a multiprocessor environment, access to the queue 204 and the context control blocks 232a . . . 232n or other data structures can be controlled by a suitable locking mechanism to provide serial access to these features.

In addition, the index field 230 of the Context A control block 232a is incremented (block 245) to indicate that the next subtask in sequence for the Context A is subtask sequence number 2. As the walking of the queue 204 continues, the next subtask, subtask 220c, in the queue 204 is examined (block 242). A comparison (block 224) of the sequence number (sequence No. 2) as indicated by the field 52 of the subtask 220c, to the index field 230 of the Context A control block 232a, indicates that subtask 220c is the next in sequence subtask of Context A. Accordingly, subtask 220c is sent (block 244) to the mail manager of the cluster and the index field 230 of the Context A control block 232a is incremented to indicate that the next subtask in sequence for the Context A is subtask sequence number 3.

As the walking of the queue 204 continues, the next subtask, subtask 220a, in the queue 204 is examined (block 242). Since the subtask 220a is the next in sequence subtask of Context A, subtask 220a is sent (block 244) to the mail manager of the cluster and the index field 230 of the Context A control block 232a is incremented to indicate that the next subtask in sequence for the Context A is subtask sequence number 4. Thus, subtask 220b having sequence number 4 is sent and the index field 230 of the Context A control block 232a is incremented to indicate that the next subtask in sequence for the Context A is subtask sequence number 5. Since the next subtask 220e in the subqueue 206a has subtask sequence no. 7, subtask 220e is not the next in sequence subtask of Context A and it remains in the queue (FIG. 5E) until it is the next in sequence subtask of Context A. This walking of the queue 204 is continued until the end of the queue is reached (block 240).

Figure 5E:
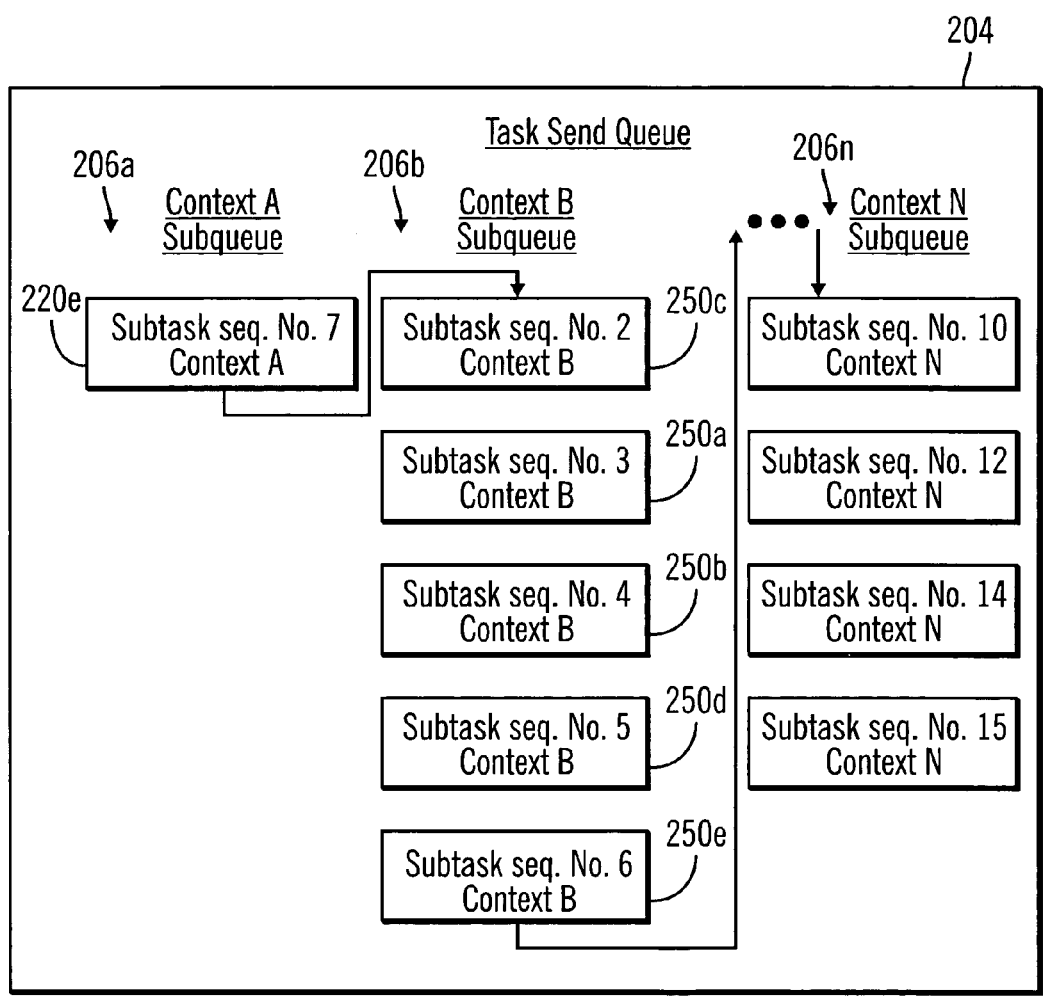

FIG. 6 shows an example of another subtask 250c of the Context B which has been prepared and received (block 200) for forwarding to the secondary storage controller 106b. Accordingly, the subtask 250c is queued in the queue 204 as shown in FIG. 5E. Because subtask 250c is associated with Context B (as indicated by the field 52), the subtask 250c is queued in the subqueue 206b of the queue 204. In addition, because the subtask 250c has sequence number "2" in this example, subtask 250c is placed in front of subtask 250a having sequence number "3" as shown FIG. 5E.

The queue 204 of FIG. 5E is again "walked" to determine if any of the queued subtasks can be forwarded to the mail manager to generate a write operation for the secondary storage controller 106b. Accordingly, the subtask at the front of the queue is examined (block 222). In the example of FIG. 5E, the subtask at the front of the queue is now subtask 220e of the subqueue 206a. A determination is made (block 224) as to whether subtask 220e is the next in sequence for the associated context, here Context A, in this example. The index field 230 of a control block 232a, indicates that the next subtask in sequence for Context A is now subtask sequence no. 5. Since subtask 220e has sequence no. 7, it is determined (block 224) that the subtask 220c is not the next in sequence for Context A.

As the walking of the queue 204 continues, the next subtask, subtask 250c, in the queue 204 is examined (block 242). A comparison (block 224) of the sequence number (sequence No. 2) as indicated by the field 52 of the subtask 250c, to the index field 230 of the Context B control block 232b, indicates that subtask 250c is the next in sequence subtask of Context B. Accordingly, subtask 250c is sent (block 244) to the mail manager of the cluster and the index field 230 of the Context B control block 232b is incremented to indicate that the next subtask in sequence for the Context B is subtask sequence number 3. As the walking of the queue 204 continues, subtasks 250a, 250b, 250d and 250e are sent in sequence to the mail manager.

Additional Implementation Details

The described techniques for transmitting tasks and subtasks may be implemented as a method, apparatus or article of manufacture using standard programming and/or engineering techniques to produce software, firmware, hardware, or any combination thereof. The term "article of manufacture" as used herein refers to a storage medium having code or logic implemented therein, and a transmission medium having code or logic implemented therein. As used herein, the term "storage medium having code or logic implemented therein" refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor complex. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

In the described implementations, certain tasks or contexts were described as comprising sequences of subtasks. It is appreciated that some tasks may have no subtasks or sequencing and that some embodiments of the invention are suitable for one or both types of tasks. Thus, operations or contexts having no subtasks may be queued on the queues as well.

In the described implementations, certain operations were described as performed by processors of the processor complexes 122a, and 122b and the adapter 130. In alternative implementations, certain operations described as performed by the processor complexes and adapters may be performed by a variety of computers, processors, and controllers.

In described implementations, certain characteristics were described as sequence numbers. It is appreciated that the "numbers" may be any combination of numerals, letters, characters or other identifying indicia or information. It is further appreciated that a "sequence" may be any defined ordering of such "numbers."

In described implementations, certain queues and subqueues were described as being "sorted" by context and sequence. It is appreciated that sorting may be achieved in a variety of techniques including use of indexing, tables, data movement etc. Also, in some embodiments, the queues and subqueues may not be sorted.

The described implementations for task transmission were described for use with systems deployed in a data environment where high availability is of value. However, those skilled in the art will appreciate that the resource management operations described herein may apply to computational and storage systems used for non-critical data.

In the described implementations, dual clusters were provided. In alternative implementations, there may be only one or more than two clusters and task transmission may be practiced in any one clusters.

The illustrated logic of FIG. 4, shows certain events occurring in a certain order. In alternative implementations, certain operations may be performed in a different order, modified or removed. Moreover, steps may be added to the above described logic and still conform to the described implementations. Further, operations described herein may occur sequentially or certain operations may be processed in parallel. Yet further, operations may be performed by a single processing unit or by distributed processing units.

The variable N is used to denote any integer variable for certain of the described elements and may indicate a same or different integer value when used in different instances.

Figure 8:
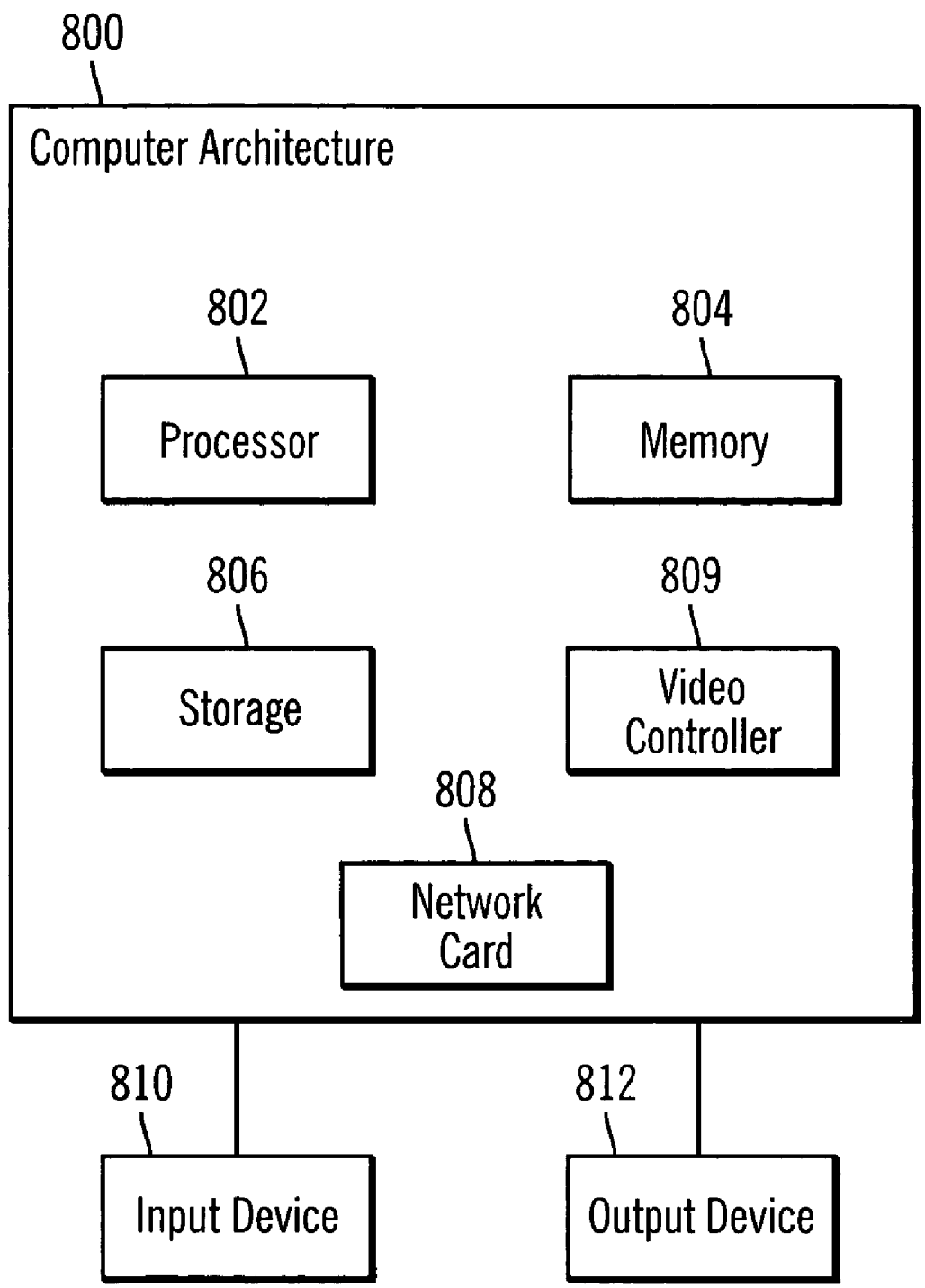
FIG. 8 illustrates an architecture of computing components in a network environment, such as the hosts, storage controllers, clusters, and any other computing devices.

FIG. 8 illustrates one implementation of a computer architecture 800 of the network components, such as the hosts and storage controller clusters shown in FIG. 2. The architecture 800 may include a processor 802 (e.g., a microprocessor), a memory 804 (e.g., a volatile memory device), and storage 806 (e.g., a non-volatile storage, such as magnetic disk drives, optical disk drives, a tape drive, etc.). The storage 806 may comprise an internal storage device or an attached or network accessible storage. Programs in the storage 806 are loaded into the memory 804 and executed by the processor 802 in a manner known in the art. The architecture further includes a network controller 808 to enable communication with a network, which may comprise a Storage Area Network (SAN), Local Area Network (LAN), Intranet, the Internet, Wide Area Network (WAN), etc. An input device 810 is used to provide user input to the processor 802, and may include a keyboard, mouse, pen-stylus, microphone, touch sensitive display screen, or any other activation or input mechanism known in the art. An output device 812 is capable of rendering information transmitted from the processor 802, or other component, such as a display monitor, printer, storage, etc.

The foregoing description of various implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method comprising:
   maintaining in a first data structure in a first storage controller, a first index for a first write data task for writing data to a storage device coupled to the first storage controller and for writing data to a storage device coupled to a second storage controller, wherein the first write data task comprises a first sequence of data writing subtasks in which each subtask has a sequence number identifying the position of the subtask in the sequence of subtasks of the first write data task and wherein the first index identifies the sequence number of the next subtask in sequence to be sent by a first processor of the first storage controller to a second processor of the first storage controller;

adding a subtask of said first sequence of data writing subtasks to a queue;

comparing the sequence number of a subtask in the queue to the index of the first data structure; and if the subtask in the queue has the sequence number identified by the index, sending the subtask to a second processor of the first storage controller to generate a write command to the second storage controller.

2. The method of claim 1 further comprising:

maintaining in a second data structure in the first storage controller, a second index for a second write data task for writing data to a storage device coupled to the first storage controller and for writing data to a storage device coupled to the second storage controller, wherein the second write data task comprises a second sequence of data writing subtasks in which each subtask has a sequence number identifying the position of the subtask in the sequence of subtasks of the second write data task and wherein the second index identifies the sequence number of the next subtask in sequence of the second write data task to be sent to a second processor of the first storage controller.

3. The method of claim 2 further comprising:

adding a subtask of said second sequence of data writing subtasks to said queue;

comparing the sequence number of a subtask in the queue to the index of the second data structure; and if the subtask in the queue has the sequence number identified by the index of the second data structure, sending the subtask to a second processor of the first storage controller to generate a write command to the second storage controller.

4. The method of claim 3 wherein each subtask has a field identifying the write data task of which it is a subtask and wherein each data structure has a field identifying the write data task for which the index of the data structure identifies the sequence number of the next subtask in sequence for the write data task of the data structure, said method further comprising:

identifying the data structure containing the index to be used for comparing the sequence number of a subtask in the queue to the index of the identified data structure, using the subtask field identifying the write data task of which it is a subtask and using the data structure field identifying the write data task of the data structure.

5. The method of claim 4 wherein said adding a subtask of said first sequence of data writing subtasks to said queue includes adding a subtask of said first sequence of data writing subtasks to a first subqueue of said queue and wherein said adding a subtask of said second sequence of data writing subtasks to said queue includes adding a subtask of said second sequence of data writing subtasks to a second subqueue of said queue.

6. The method of claim 5 wherein said first subqueue of subtasks of said first sequence of data writing subtasks is sorted in sequential order and wherein said second subqueue of subtasks of said second sequence of data writing subtasks is sorted in sequential order.

7. The method of claim 6 wherein said identifying and comparing is repeated for each subtask in said queue each time a subtask is added to the queue.

8. The method of claim 7 wherein the sequence number of each subtask corresponds to a track of a storage device coupled to said second storage controller.

9. A storage medium having at least one of code and logic implemented therein which causes operations, the operations comprising:

maintaining in a first data structure in a first storage controller, a first index for a first write data task for writing data to a storage device coupled to the first storage controller and for writing data to a storage device coupled to a second storage controller, wherein the first write data task comprises a first sequence of data writing subtasks in which each subtask has a sequence number identifying the position of the subtask in the sequence of subtasks of the first write data task and wherein the first index identifies the sequence number of the next subtask in sequence to be sent by a processor of the first storage controller to a second processor of the first storage controller;

adding a subtask of said first sequence of data writing subtasks to a queue;

comparing the sequence number of a subtask in the queue to the index of the first data structure; and if the subtask in the queue has the sequence number identified by the index, sending the subtask to a second processor of the first storage controller to generate a write command to the second storage controller.

10. The storage medium of claim 9, the operations further comprising:

maintaining in a second data structure in the first storage controller, a second index for a second write data task for writing data to a storage device coupled to the first storage controller and for writing data to a storage device coupled to the second storage controller, wherein the second write data task comprises a second sequence of data writing subtasks in which each subtask has a sequence number identifying the position of the subtask in the sequence of subtasks of the second write data task and wherein the second index identifies the sequence number of the next subtask in sequence of the second write data task to be sent by a processor of the first storage controller to a second processor of the first storage controller.

11. The storage medium of claim 10, the operations further comprising:

adding a subtask of said second sequence of data writing subtasks to said queue;

comparing the sequence number of a subtask in the queue to the index of the second data structure; and if the subtask in the queue has the sequence number identified by the index of the second data structure, sending the subtask to a second processor of the first storage controller to generate a write command to the second storage controller.

12. The storage medium of claim 11 wherein each subtask has a field identifying the write data task of which it is a subtask and wherein each data structure has a field identifying the write data task for which the index of the data structure identifies the sequence number of the next subtask in sequence for the write data task of the data structure, the operations further comprising:

identifying the data structure containing the index to be used for comparing the sequence number of a subtask in the queue to the index of the identified data structure, using the subtask field identifying the write data task of which it is a subtask and using the data structure field identifying the write data task of the data structure.

13. The storage medium of claim 12 wherein said adding a subtask of said first sequence of data writing subtasks to said queue includes adding a subtask of said first sequence of data writing subtasks to a first subqueue of said queue and wherein said adding a subtask of said second sequence of data writing subtasks to said queue includes adding a subtask of said second sequence of data writing subtasks to a second subqueue of said queue.

14. The storage medium of claim 13 wherein said first subqueue of subtasks of said first sequence of data writing subtasks is sorted in sequential order and wherein said second subqueue of subtasks of said second sequence of data writing subtasks is sorted in sequential order.

15. The storage medium of claim 14 wherein said identifying and comparing is repeated for each subtask in said queue each time a subtask is added to the queue.

16. The storage medium of claim 15 wherein the sequence number of each subtask corresponds to a track of a storage device coupled to said second storage controller.

17. A system for use with a remote storage controller having a storage device coupled to said remote storage controller, comprising:
  a first storage controller including a plurality of processors, a first data structure, a second data structure, and a queue; said first storage controller having a storage device coupled to said first storage controller;
  means for maintaining in said first data structure, a first index for a first write data task for writing data to said storage device coupled to the first storage controller and for writing data to a storage device coupled to a remote storage controller, wherein the first write data task comprises a first sequence of data writing subtasks in which each subtask has a sequence number identifying the position of the subtask in the sequence of subtasks of the first write data task and wherein the first index identifies the sequence number of the next subtask in sequence to be sent to a second processor of the first storage controller;
  means for adding a subtask of said first sequence of data writing subtasks to said queue;
  means for comparing the sequence number of a subtask in the queue to the index of the first data structure; and
  means for, if the subtask in the queue has the sequence number identified by the index, sending the subtask to a second processor of the first storage controller to generate a write command to the remote storage controller.

18. The system of claim 17 further comprising:
  means for maintaining in the second data structure of the first storage controller, a second index for a second write data task for writing data to a storage device coupled to the first storage controller and for writing data to a storage device coupled to the remote storage controller, wherein the second write data task comprises a second sequence of data writing subtasks in which each subtask has a sequence number identifying the position of the subtask in the sequence of subtasks of the second write data task and wherein the second index identifies the sequence number of the next subtask in sequence of the second write data task to be sent to a second processor of the first storage controller.

19. The system of claim 18 further comprising:
  means for adding a subtask of said second sequence of data writing subtasks to said queue;
  means for comparing the sequence number of a subtask in the queue to the index of the second data structure; and
  means for, if the subtask in the queue has the sequence number identified by the index of the second data structure, sending the subtask to a second processor of the first storage controller to generate a write command to the remote storage controller.

20. The system of claim 19 wherein each subtask has a field identifying the write data task of which it is a subtask and wherein each data structure has a field identifying the write data task for which the index of the data structure identifies the sequence number of the next subtask in sequence for the write data task of the data structure, said system further comprising:
  means for identifying the data structure containing the index to be used for comparing the sequence number of a subtask in the queue to the index of the identified data structure, using the subtask field identifying the write data task of which it is a subtask and using the data structure field identifying the write data task of the data structure.

21. The system of claim 20 wherein said queue includes a first subqueue and a second subqueue and said means for adding a subtask of said first sequence of data writing subtasks to said queue includes means for adding a subtask of said first sequence of data writing subtasks to said first subqueue of said queue and wherein said means for adding a subtask of said second sequence of data writing subtasks to said queue includes means for adding a subtask of said second sequence of data writing subtasks to said second subqueue of said queue.

22. The system of claim 21 wherein said means for adding a subtask of said first sequence of data writing subtasks includes means for sorting said first subqueue of subtasks of said first sequence of data writing subtasks in sequential order and wherein means for adding a subtask of said second sequence includes means for sorting said second subqueue of subtasks of said second sequence of data writing subtasks in sequential order.

23. The system of claim 22 wherein said identifying and comparing is repeated for each subtask in said queue each time a subtask is added to the queue.

24. The system of claim 23 wherein the sequence number of each subtask corresponds to a track of a storage device coupled to said remote storage controller.

* * * * *